United States Patent [19]

Freitas et al.

[11] Patent Number: 5,733,404

[45] Date of Patent: Mar. 31, 1998

[54] TRANSLAMINAR REINFORCEMENT SYSTEM FOR Z-DIRECTION REINFORCEMENT OF A FIBER MATRIX STRUCTURE

[75] Inventors: Glen Freitas, Foxboro; Joseph S. Boyce, Hanover; Constance Magee, Wilmington, all of Mass.

[73] Assignee: Foster Miller, Inc., Waltham, Mass.

[21] Appl. No.: 545,392

[22] Filed: Oct. 19, 1995

Related U.S. Application Data

[62] Division of Ser. No. 297,415, Aug. 26, 1994, Pat. No. 5,466,506, which is a continuation of Ser. No. 967,192, Oct. 27, 1992, abandoned.

[51] Int. Cl.$^6$ .................................................. B32B 3/26
[52] U.S. Cl. .................... 156/285; 156/287; 156/303.1; 264/271.1
[58] Field of Search ...................... 264/239, 375, 264/378, 396, 401; 156/285, 287, 303.1

[56] References Cited

U.S. PATENT DOCUMENTS 4,808,461  2/1989  Boyce et al. ........................ 428/119

*Primary Examiner*—Richard Weisberger
*Attorney, Agent, or Firm*—Iandiorio & Teska

[57] ABSTRACT

A translaminar reinforcement system for Z-direction reinforcement of a fiber matrix structure in which a plurality of reinforcing elements are disposed in a body of compactible material to extend in at least one direction and orientated at at least one acute angle and driven into a fiber matrix structure when the body is compacted by a compressive force.

5 Claims, 4 Drawing Sheets

STEP 1

STEP 2

STEP 3

TRANSLAMINAR REINFORCEMENT SYSTEM FOR Z-DIRECTION REINFORCEMENT OF A FIBER MATRIX STRUCTURE

This is a division of application Ser. No. 08/297,415, filed Aug. 26, 1994, now U.S. Pat. No. 5,966,506 which is a continuation of 07/967,192 filed Oct. 27, 1992, now abandoned.

FIELD OF INVENTION

This invention relates to a translaminar reinforcement system for Z-directional reinforcement of a fiber matrix structure.

BACKGROUND OF INVENTION

Composite structures are now extensively utilized in many industries and in some cases provide higher strength and stiffness than metallic materials. Composites also have a strength to weight ratio desirable in many aerospace applications. In addition, composites have a high resistance to most chemical and environmental threats.

Composites are formed with a variety of techniques most of which involve different ways of forming a combination fiber matrix material. One such technique is the resin transfer molding process: dry fiber material is formed to a desired part shape (preformed) and then impregnated with resin which is subsequently cured. Alternatively, a sizer or tackifier may be used to retain the dry fiber "preform" in the desired shape and the preform is subsequently impregnated with resin and cured similar to the procedure in the resin transfer molding process. Another technique uses prepreg materials in conjunction with a secondary molding operation. Fiber material is precombined with resin as a prepreg which is then shaped and cured in an autoclave, platen press, or suitable processing equipment which subjects the prepreg to various pressure and temperature cycles.

Also, composites can be combined during manufacture with materials other than fiber and resin as desired for added strength and flexibility. For example, foam layers or other core material can be incorporated between fiber and resin layers to form a cored or sandwich structure. This type of structure is usually applied when added stiffness is more critical than weight. The core is lighter than the composite providing added stiffness at reduced weight.

Regardless of the process used, however, all composites exhibit certain shortcomings. For example, interlaminar strength is poor in comparison with in plane properties of the composite because they are matrix dominated. Composites have excellent properties along the X-Y plane of the reinforcing fibers and manufacturing methods used to produce two dimensional structures are well developed. Low interlaminar (perpendicular to the plane in the Z-direction) strength and fracture toughness, however, limits the use of composites in many applications. Also, cracks or delaminations caused by thermal effects, impact events, or the presence of holes or free edges in the composite may seriously reduce compressive and flexural loading capacities or cause delamination which may result in premature structural failure.

There are a number of techniques for overcoming these limitations in composites. The two most frequently used are toughened matrices and through the thickness reinforcing fibers. Toughened matrices, however, are often 1.5 to 2 times more expensive than baseline systems, have poor hot wet properties, and still may not prove to offer enough toughness for a successful part design. Several techniques have been developed for placing fibers through the thickness of composites to improve interlaminar properties.

Also, stitching, stapling, and needling techniques are known, but these methods may cause a significant reduction of in-plane properties, are difficult to implement within complex-shaped laminates, and limit the type of fiber which can be utilized for reinforcement. Stitching uses needles which are often in excess of 0.2" in width. When penetrating a fiber laminate with a needle of this size, significant cutting or damage is caused to the load carrying in plane fibers. This can create strength reductions in excess of 20%. In addition to the needle damage, stitching uses a continuous thread. The loop in the thread traversing from one stitch to the next "kinks" the inplane fibers of the top few plies creating significant strength loss. Because of the demanding bend radii of stitching, the fiber material that can be practically used are limited to glass and kevlar. These materials are not the most effective through thickness reinforcements for all applications, and moreover, kevlar has been known to absorb moisture.

Another recent technique for overcoming these problems and disadvantages is shown in U.S. Pat. No. 4,808,461. A plurality of reinforcing elements are disposed wholly in a direction perpendicular to the plane of a body of thermally decomposable material. This structure is then placed on a prepreg and subjected to an elevated temperature which decomposes the thermally decomposable material. Pressure is used to drive the reinforcing elements into the prepreg which is then cured. The final composite part will contain the perpendicularly disposed reinforcing elements which add strength at desired locations of the composite part. This technique has been called "Z-direction reinforcement."

Another method, directed at prepreg techniques, uses a pin carrier to drive pins perpendicularly into the prepreg which is then shaped and cured. These techniques, too, have shortcomings.

For example, reinforcing fibers introduced purely perpendicular to the plane of the composite significantly reduce the tendency for the laminate to peel apart (mode I fracture), but they do not as significantly improve on the possibility of shear or mode II dominated failures. This is because these loads generally occur parallel to the in plane fibers of the composite and the reinforcing fibers are normal to the inplane fibers.

Manually inserting reinforcing rods at an angle to the inplane fibers in laminates along critically high stress planes before the layup of the graphite-epoxy plies is cured is known, but the tedious insertion of each reinforcing rod and the experimentation and analysis required to predetermine the critically high stress planes make this technique labor intensive and hence costly. It is also known to manually drive individual thermosetting resin-impregnated fibrous reinforcements at an angle into a fibrous material lay-up by mechanical impact or similar tools. This technique also requires labor intensive and close tolerance manufacturing techniques not suitable for all applications.

SUMMARY OF INVENTION

It is therefore an object of this invention to provide a translaminar reinforcement system and method for Z-direction reinforcement of a fiber matrix structure.

It is a further object of this invention to provide such a translaminar reinforcement system and method which reduces both mode I and mode II fractures in the fiber matrix without stitching, stapling, or needling operations or tedious and labor intensive reinforcing element insertion techniques.

It is a further object of this invention to provide such a translaminar reinforcement system and method which improves the interlaminar strength and fracture toughness of the fiber matrix structure.

It is a further object of this invention to provide such a translaminar reinforcement system and method which matches the contours of the reinforcement system to the contours of the fiber matrix structure to be reinforced.

It is a further object of this invention to provide such a translaminar reinforcement system and method which allows resin impregnation of the fiber matrix structure at the same time the reinforcing elements are driven into the fiber matrix structure.

It is a further object of this invention to provide such a translaminar reinforcement system and method which is employable in fiber matrix structures formed by the resin transfer molding process as well as by prepreg and preforming techniques.

This invention results from the realization that mode I and mode II fracture properties can be increased in a fiber matrix structures and the overall strength of a fiber matrix structure can be improved by a system in which reinforcing elements are installed in the fiber matrix structure in a direction of at least one or even various acute angles and in at least one or even many different directions by using a body of generally compactible material that includes means for receiving a compacting force which will drive the reinforcing elements into the fiber matrix structure as the compactible body is compressed, thereby achieving Z-direction reinforcement without stitching, stapling, or needling operations and without the need to individually insert reinforcing elements. Furthermore, such a device and method are employable with composite parts manufactured using resin injection, prepreg and/or preforming operations.

This invention features a translaminar reinforcement system for Z-direction reinforcement of a fiber matrix structure in which a plurality of reinforcing elements are disposed in a body of compactible material to extend in at least one direction and orientated at at least one acute angle and driven into a fiber matrix structure when the body is compacted by a compressive force.

The compactible material of the body may be a substance compressible under pressure such as an elastomeric substance, or even a thermally decomposable material. Pressure intensifying means may be disposed on one surface of the body. The material of the body of compactible material may be selected from the class consisting of RTV silicon rubber, FIBERFORM™ Graphite Insulation, KAO-WOOL™ Ceramic Insulation, phenolic based foam, fiberglass, and polymide based insulation, melamine, Rohacell™, Polymathacrylimide™, Diveneycell™, crosslinked polyvinyl, and Klegecell™, based rigid polyvinyl chlorides, foams, PVC polyvinylchlorides, polyesters, polyethylenes, polypropylenes, polyurethanes, polystyrenes, polyimides, cellulose acetates, silicones polybenzimidazoles, polyvinyls, "PEEK" polyetheretherkeytone, "PPS" polyphelonlynesulfide, carbon and graphite.

The reinforcing elements may extend at the same acute angle in different directions, at different acute angles in the same general direction, or at different acute angles in different directions depending on the specific application for reducing both mode I and Mode II fracture tendencies of unreinforced composite structures. The material of the reinforcing elements may be selected from the class consisting of aluminum, boron, carbon, graphite, kevlar, stainless steel, titanium, tungsten, glass, silicon carbide, aluminum oxide, aluminum nitride, rigid phenolics, rigid polyimides, rigid epoxies, thermoplastics and composites of such materials.

Because of the versatility of this invention, the fiber matrix structure to be reinforced may be a composite structure formed of fibers in a resin matrix, a prepreg material, or a dry fibrous preform material. In addition, the body of compactible material may include resin for resin infusion of the fiber matrix structure as the body in compressed and the reinforcing fibers are inserted. The resin may be selected from the class of materials consisting of epoxies, polyimides, bismaleimides, phenolics, polycyanurate, "PEEK" polyetherethenkeytone, PPS polyphelolynesulfide, "AVAMID" polymides, polyester, and vinylesters.

Moreover, the body of compactible may be thermoformed to match one or more contours of the fiber matrix structure to be reinforced for selective reinforcement of potentially high stress areas of the composite part.

This invention also features a method of reinforcing a fiber matrix structure including providing a body of generally compactible material that has spaced opposing surfaces at least one of which includes means for receiving a compacting force; and disposing a plurality of reinforcing elements in said body to extend in at least one direction and orientated at at least one angle acute to one of said opposing surfaces.

The body may be placed on the surface of a fiber matrix structure to be reinforced such that the means for receiving a compacting force is spaced from the surface of the structure. When force is applied to the body, via the means for receiving a compacting force, the reinforcing elements are driven into the fiber matrix structure. Furthermore, the body of compactible material may be soaked with resin and/or thermoformed to match the contours of the composite part to be reinforced prior to compaction.

DISCLOSURE OF PREFERRED EMBODIMENT

Other objects, features and advantages will occur to those skilled in the art from the following description of a preferred embodiment and the accompanying drawings, in which.

Figure 1:
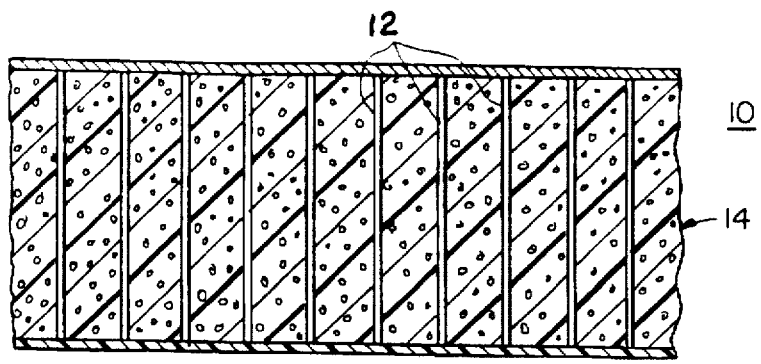
FIG. 1 is a cross-sectional view of a prior art Z-direction reinforcement structure.

In prior art Z-direction reinforcement system 10, FIG. 1, reinforcement elements 12 are disposed wholly in a direction perpendicular to the plane of a body of thermally decomposable material 14. As delineated in the Background of Invention above, system 10 is placed on a prepreg and subjected to elevated temperature and pressure cycles. Thermally decomposable material 14 essentially collapses as reinforcement elements 12 are driven perpendicularly into the prepreg which is then cured. The resulting composite is stronger than an otherwise unreinforced composite in a direction transverse to the plane of the composite. Accordingly, the tendency for the composite to delaminate, also called mode I fracture, is reduced. Shear dominated fractures, also called mode II fractures, however, are not significantly reduced because these loads generally occur along the plane of the composite.

Figure 2:
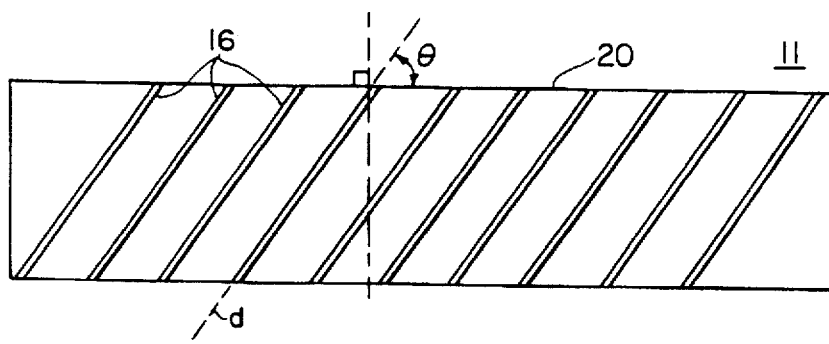
FIG. 2 is a cross-sectional view of a translaminar reinforcement system for Z-directional reinforcement of a fiber matrix structure according to this invention.
Figure 3:
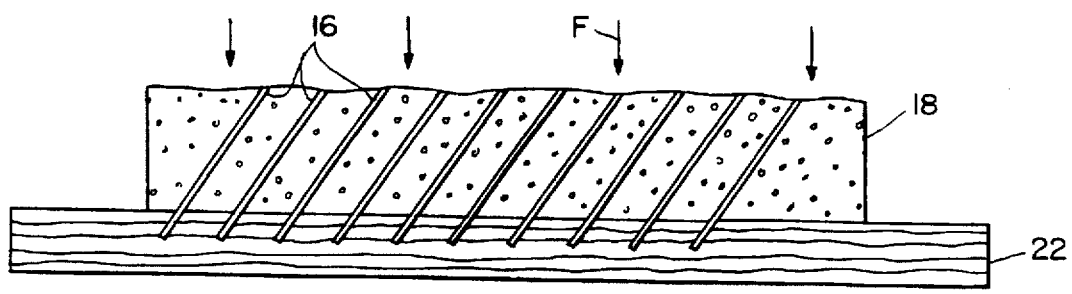
FIGS. 3–5 are cross-sectional views of the reinforcement system of FIG. 2 showing compression of the compactible body to drive the reinforcing elements into a fiber matrix structure.
Figure 4:
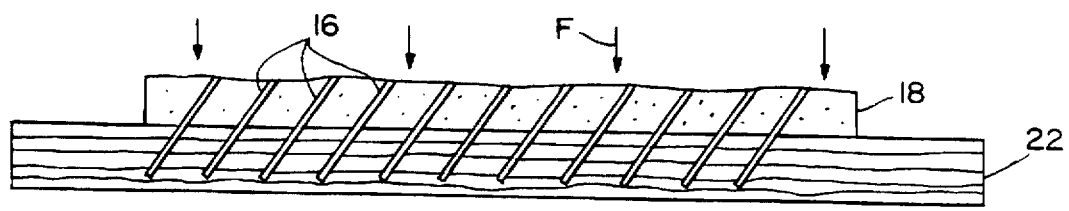
Figure 5:
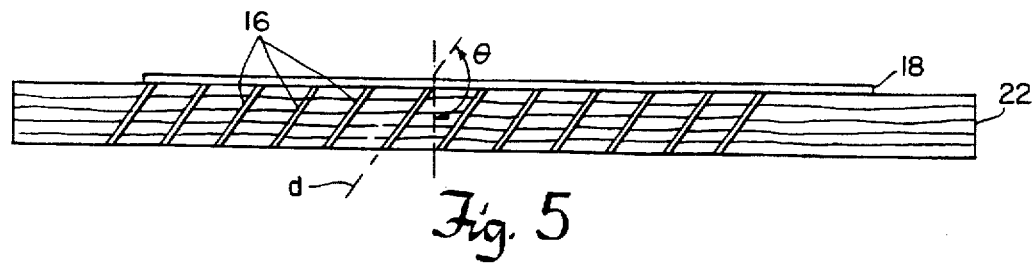

In translaminar reinforcement system 11, according to this invention FIG. 2, reinforcement elements 16 are disposed in a body of generally compactible material 18 having surface 20 for receiving a compacting force. Reinforcement elements 16 extend in direction d and are orientated at acute angle theta to surface 20 in translaminar reinforcement system 11. Compacting force F, FIG. 3, is used to compress body 18 and to drive reinforcing elements 16 into fiber matrix structure 22 as shown in progression in FIGS. 3–5. Since the reinforcement elements 16, FIG. 5, extend in direction d and are orientated at acute angle theta to surface 20, both mode I and mode II fracture properties are increased in fiber matrix structure 22. And, system 11 according to this invention is not limited to application in only one or two composite forming techniques. Fiber matrix structure 22 may be fibers in a resin matrix, a prepreg or preform material.

Figure 6:
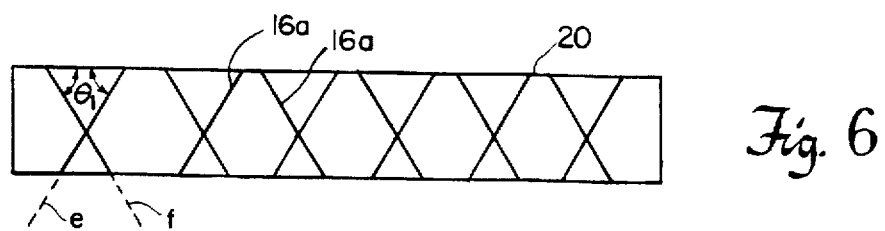
FIGS. 6–8 are cross-sectional views of other arrangements of the reinforcing elements in a compactible body.
Figure 7:
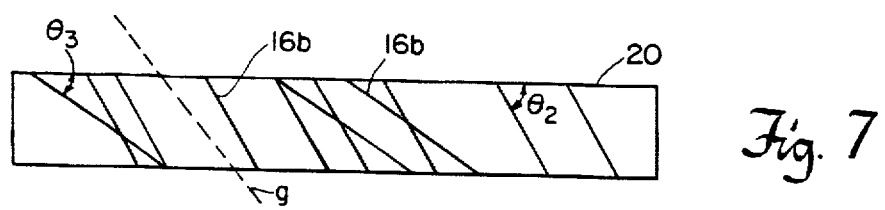
Figure 8:
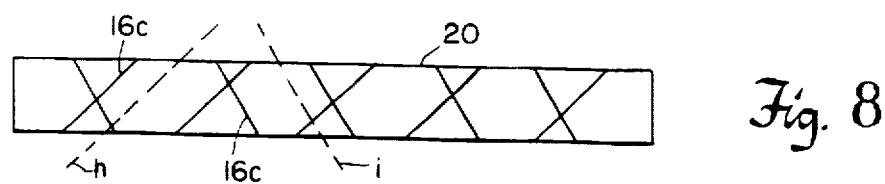

Depending on the specific application, reinforcing elements 16, FIG. 2, may extend in the same direction d at the same angle theta with respect to surface 20. Alternatively, reinforcing elements 16a, FIG. 6, may extend in different directions e and f at the same acute angle theta with respect to surface 20. In another embodiment, reinforcing elements 16b, FIG. 7, all extend generally in direction g, but at different acute angles theta2 and theta3 with respect to surface 20. In still another embodiment, reinforcing elements 16c, FIG. 8, extend in different directions h and i and also at different acute angles theta4 and theta5 with respect to surface 20.

Figure 9:
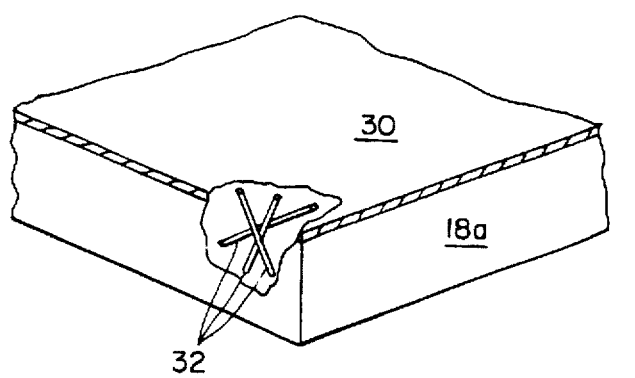
FIG. 9 is a schematic perspective view of a translaminar reinforcement system for Z-directional reinforcement of a fiber matrix structure having a pressure intensifying portion and resin wherein the reinforcing elements extend at different acute angles in different directions.

Compactible body 18a, FIG. 9, may include pressure intensifying layer 30 which aids in driving reinforcing elements 32, shown in FIG. 9, extending in different directions and at different angles, into a fiber matrix structure. Reinforcing elements 32 may be selected from the class consisting of aluminum, boron, carbon, graphite, kevlar, stainless steel, titanium, tungsten, glass, silicon carbide, aluminum oxide, aluminum nitride, rigid phenolics, rigid polyimides, rigid epoxies, thermoplastics and composites of such materials.

Body 18, FIG. 2, may be made of a substance compressible under pressure including an elastomeric material such as RTV silicon rubber, FIBERFORM™ Graphite Insulation, KAOWOOL™ Ceramic Insulation, phenolic based foam, fiberglass, and polymide based insulation, melamine, Rohacell™, Polymathacrylimide™, Diveneycell™, crosslinked polyvinyl, and Klegecell™, based rigid polyvinyl chlorides, foams, PVC polyvinylchlorides, polyesters, polyethylenes, polypropylenes, polyurethanes, polystyrenes, polyimides, cellulose acetates, silicones polybenzimidazoles, polyvinyls, "PEEK" polyetheretherkeytone, "PPS" polyphelonlynesulfide, carbon and graphite. Pressure intensifying layer 30 may be steel, aluminum, composite materials, or any material of sufficient rigidity to receive a compacting force without extreme deflection.

Figure 10:
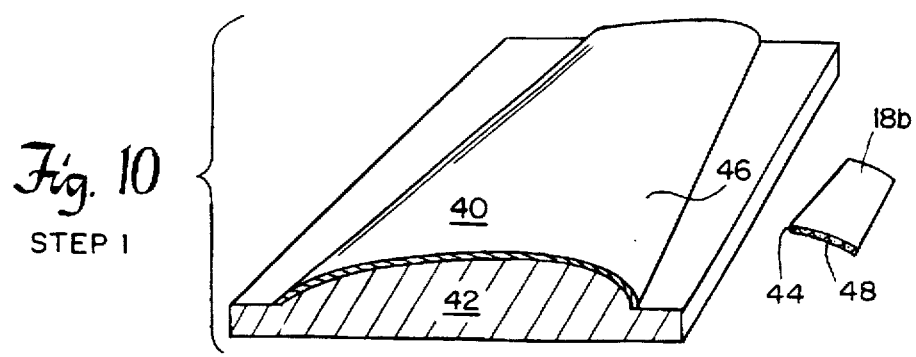
FIGS. 10–12 are a series of diagrams indicating a processing sequence according to the present invention.

In operation, fiber matrix structure 40, FIG. 10 may be first placed on mold 42. Fiber matrix structure 40 may be formed of fibers in a resin matrix already cured, fibers in uncured resin combined as a prepreg, preform material of fibrous material and tackifier, or even raw fiber matting which has yet to be impregnated. The resin used may be selected from the class of materials consisting of epoxies, polyimides, bismaleimides, phenolics, polycyanurate, "PEEK" polyetherethenkeytone, PPS polyphelolynesulfide, "AVAMID" polymides, polyester, and vinylesters.

In fact, in one embodiment of this invention, body 18b, FIG. 10 may contain resin 44 for resin infusion of fiber matrix structure 40 and furthermore may also be thermoformed to match contour 46 of fiber matrix structure 40.

Figure 14:
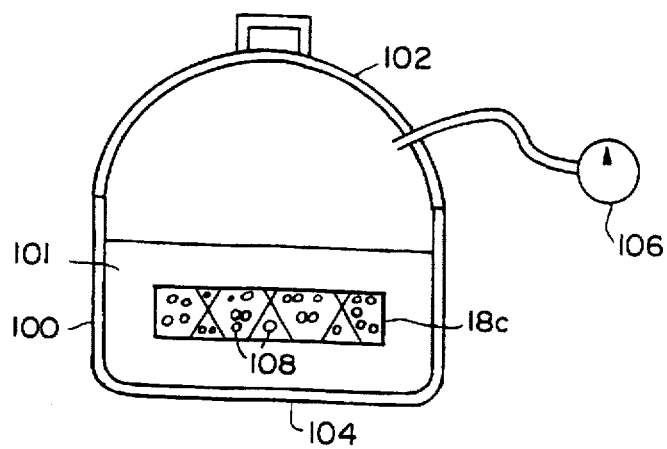
FIG. 14 is a schematic cross-sectional view of a resin reservoir which may be used to impregnate the compactable body of this invention with resin.

Body 18C may be placed in resin reservoir 100, FIG. 14, of resin 101 under pressure. Reservoir 100 may include cover 102, resin 101 in resin can 104, and vacuum pump 106. After body 18C is submerged for a time in resin 101 under pressure, the foam cells 108 of body 18C will become filed with resin.

Figure 15:
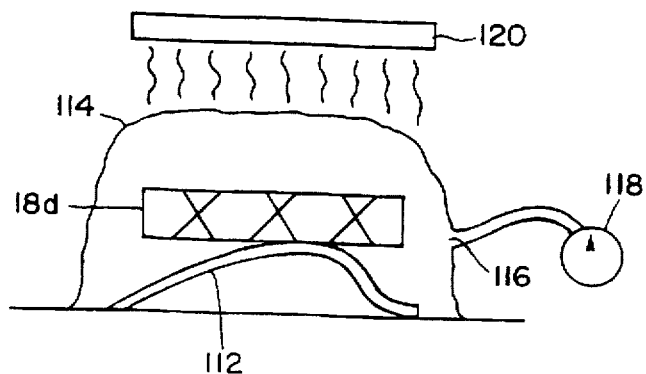
FIG. 15 is a schematic cross-sectional view of an apparatus which may be used to thermoform the capactible body of this invention to match the contours of the structure to be reinforced.
Figure 16:
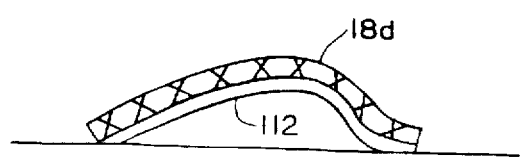
FIG. 16 is a schematic cross-sectional view of the thermoformed compactible body according to this invention.

Thermoforming body 18d, FIG. 15, to match the contour of structure 112 to be reinforced is accomplished as follows. Once body 18d is placed on structure 112, vacuum bag 114 may be used to draw a vacuum via port 116 using vacuum pump 118 until body 18d matches to contours of structure 112 to be reinforced. Also, heat from heat source 120 may be used in conjunction with the vacuum bag 114 or a combination of heat, pressure and vacuum could be used as is known. When body 18d is so thermoformed, FIG. 16, it will then match the contours of structure 112 to be reinforced.

Figure 11:
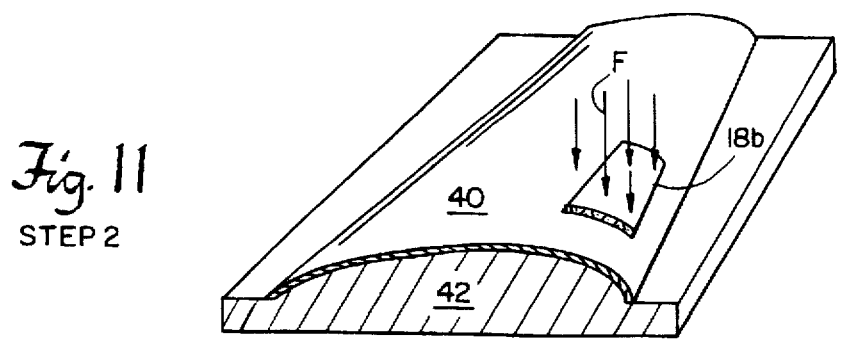
Figure 12:
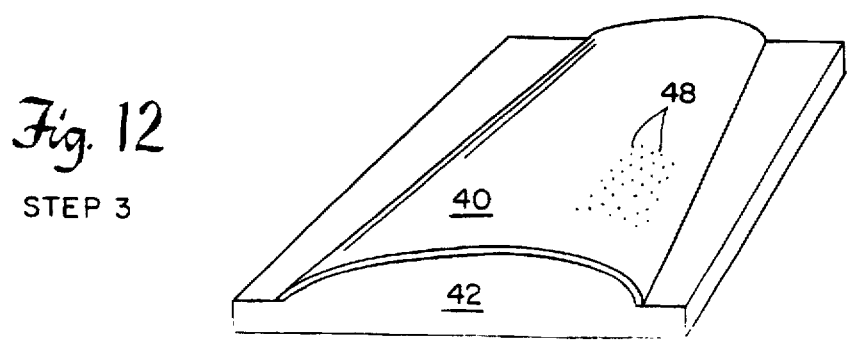

In step 2, FIG. 11, body 18b is placed in the desired location on fiber matrix structure 40 and subjected to pressure force F which drives the reinforcing elements 48 into structure 40 and at the same time also drives the resin of body 18b into structure 40. Resin impregnated fiber matrix structure 40 may then be cured, step 3, FIG. 12, and any machining necessary regarding the reinforcing elements may be accomplished as will be understood by those skilled in the art.

Figure 13:
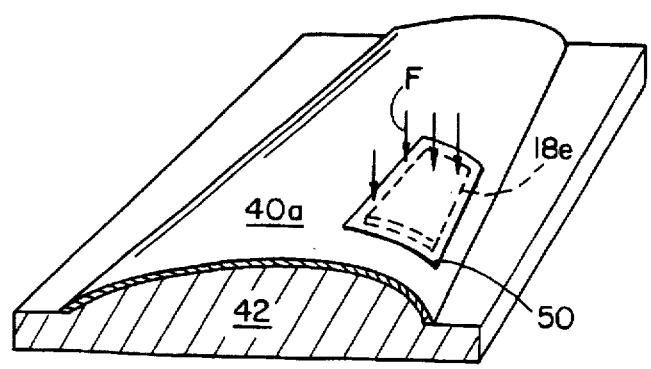
FIG. 13 is a schematic perspective view of a translaminar reinforcement system for Z-directional reinforcement of a fiber matrix structure wherein pressure intensifying means engage with the surface of the body of generally compactible material to drive the reinforcements into a fiber matrix structure.

In another embodiment, body 18e, FIG. 13, is placed on fiber matrix structure 40a and then plate 50 is used to transmit pressure force F to compressed body 18e to drive the reinforcing elements into the fiber matrix structure 40a. In this way, body 18e receives the compressive force transmitted into plate 50 without the need for additional structure incorporated in the compactible body. That is, body 18e may be made of only the materials listed above, and no reinforcing layer need be added.

Accordingly, by using selected materials for the compactible body of this invention including the reinforcing elements disposed at one or more angles and in one or more directions, the compactible body may contain resin for impregnating the structure to be reinforced and/or may be formed to match the contours of the structure to be reinforced prior to an application of pressure to drive the reinforcing elements and any resin into the structure. In another embodiment, a pressure intensifying layer may be incorporated with the generally compactible body which may also include resin and the pressure intensifying layer/compactible body combination may be pre-formed to match the contours of the structure to be reinforced.

Although specific features of this invention are shown in some drawings and not others, this is for convenience only as some feature may be combined with any or all of the other features in accordance with the invention.

Other embodiments will occur to those skilled in the art and are within the following claims:

What is claimed is:

1. A method for reinforcing a fiber matrix structure, comprising:
   providing a body of generally compactible material having spaced opposing surfaces;
   disposing a plurality of reinforcing elements in said body to extend in at least one direction and orientated at at least one angle acute to one of said opposing surfaces;
   placing said body on a fiber matrix structure to be reinforced; and
   applying pressure to said body to drive said reinforcing elements into said fiber matrix structure.

2. A method for reinforcing a fiber matrix structure comprising:
   providing a body of generally compactible material which has spaced opposing surfaces;
   disposing a plurality of reinforcing elements in said body to extend in at least one direction and orientated at at least one angle acute to one of said opposing surfaces;
   soaking said body with resin;
   placing said resin soaked body on a fiber matrix structure to be reinforced; and
   applying pressure to said body to drive said reinforcing elements and said resin into the fiber matrix structure.

3. The method of claim 1 further including curing said resin after said resin is driven into the fiber matrix structure.

4. The resin impregnated and reinforced fiber matrix structure resulting from the process comprising:
   providing a body of generally compactible material that has spaced opposing surfaces;
   disposing a plurality of reinforcing elements in said body to extend in at least one direction and orientated at at least one angle acute to one of said opposing surfaces;
   soaking said body with resin;
   placing said resin soaked body on a fiber matrix structure to be reinforced; and
   applying pressure to said body to drive said reinforcing elements and said resin into the fiber matrix structure.

5. A method for reinforcing a fiber matrix structure comprising:
   providing a contoured fiber matrix structure to be reinforced;
   providing a body of generally compactible material that has spaced opposing surfaces;
   disposing a plurality of reinforcing elements in said body to extend in at least one direction and orientated at least one angle acute to one of said opposing surfaces;
   forming said body having reinforcing elements to match at least one of the contours of the fiber matrix structure;
   placing said formed body on the fiber matrix structure to be reinforced; and
   applying pressure to said body to drive said reinforcing elements into said fiber matrix structure.

* * * * *